United States Patent

Perkins

[15] 3,696,426
[45] Oct. 3, 1972

[54] RECTILINEAR NAVIGATION SYSTEM
[72] Inventor: Earl Stuart Perkins, Oak Brook, Ill.
[73] Assignee: Butler National Corporation, Oak Brook, Ill.
[22] Filed: April 30, 1970
[21] Appl. No.: 33,233

[52] U.S. Cl..........343/107, 340/27 NA, 235/150.27
[51] Int. Cl..................................................G01s 1/08
[58] Field of Search..................343/107; 235/150.27; 340/27 NA

[56] References Cited

UNITED STATES PATENTS 3,034,724   5/1962   Perkins................235/150.27
3,059,233   10/1962  Guarino et al.........340/27 NA
3,500,413   3/1970   Dohogne et al..........343/107

Primary Examiner—Benjamin A. Borchelt
Assistant Examiner—S. C. Buczinski
Attorney—Hill, Sherman, Meroni, Gross & Simpson

[57] ABSTRACT

An aircraft navigation system which has a rectilinear navigation director with a fixed aircraft indicia and which continuously indicates the heading of the aircraft. The system also allows the setting of a waypoint or the use of a navigation station and the track may be set to fly to the waypoint or station, or at an offset distance, if desired.

10 Claims, 3 Drawing Figures

INVENTOR
Earl Stuart Perkins
ATTORNEYS

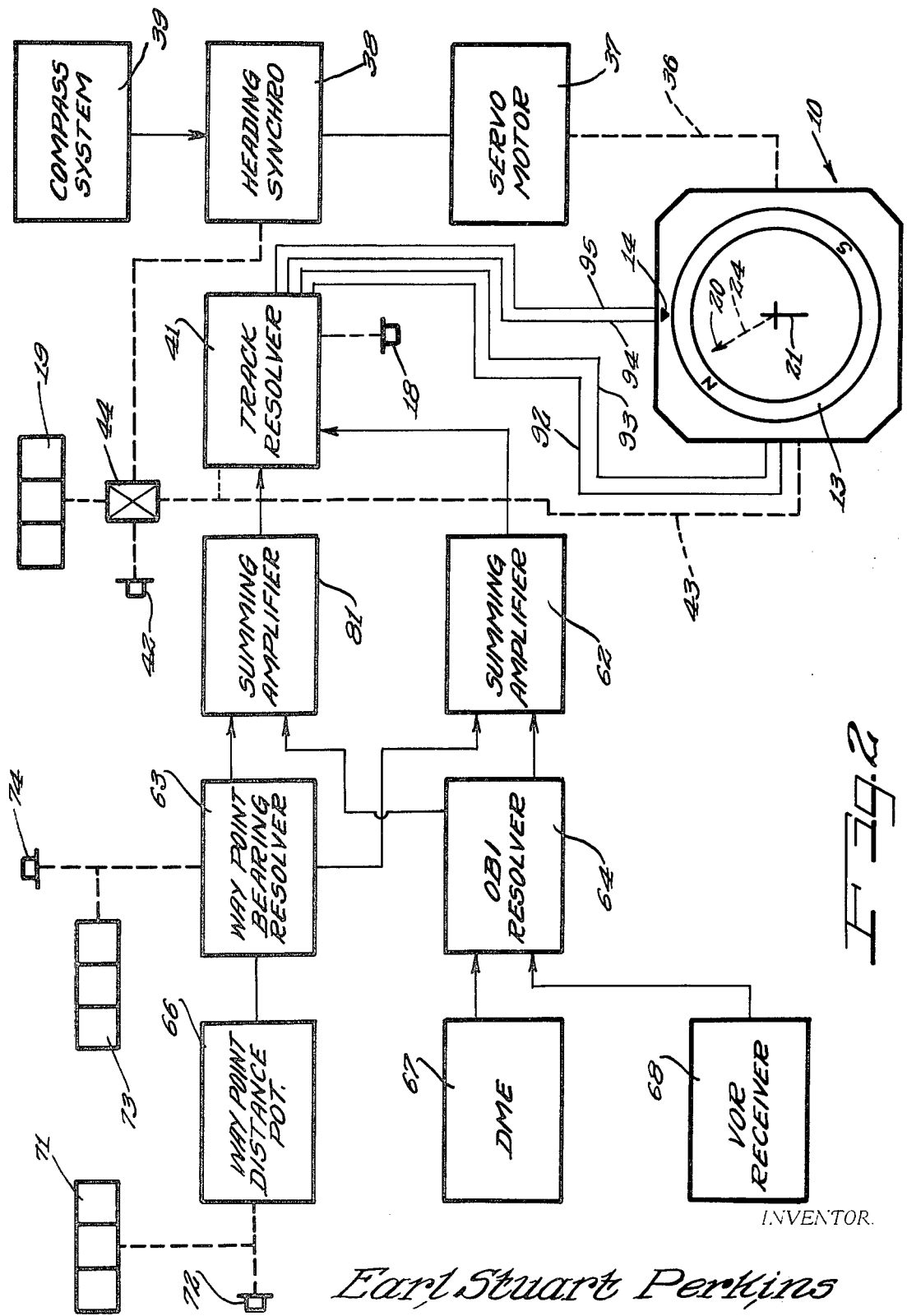

RECTILINEAR NAVIGATION SYSTEM

BACKGROUND OF THE INVENTION

1. Field of the Invention

This invention relates in general to aircraft navigation systems.

2. Description of the Prior Art

Prior navigation systems such as disclosed in my U.S. Pat. No. 3,414,901 entitled "Aircraft Navigation System" and my U.S. Pat. No. 2,801,051 entitled "Navigational System" utilized cross pointer needles which moved vertically and transversely relative to the aircraft. Certain systems have aircraft indicia which rotate to indicate the heading of the aircraft on the face of a meter.

SUMMARY OF THE INVENTION

The present invention comprises a navigation system with a director which has a fixed aircraft indicia on the face of an instrument and which has a compass system that drives a compass rose on the instrument to continuously indicate the aircraft's heading. The navigation system also has provision for setting in the distance and bearing of a waypoint from a navigation station and includes a pair of cross pointer meter movements which indicate by their intersection point the position of the waypoint relative to the aircraft. Provision is also provided for setting in a desired track to the waypoint or of an offset course relative to the waypoint.

Other objects, features and advantages of the invention will be readily apparent from the following description of a preferred embodiment thereof taken in conjunction with the accompanying drawings, although variations and modifications may be effected without departing from the spirit and scope of the novel concepts of the disclosure, and in which:

BRIEF DESCRIPTION OF THE DRAWINGS

FIG. 2 is a block diagram of the navigation system of the invention; and

DESCRIPTION OF THE PREFERRED EMBODIMENT

Figure 1:
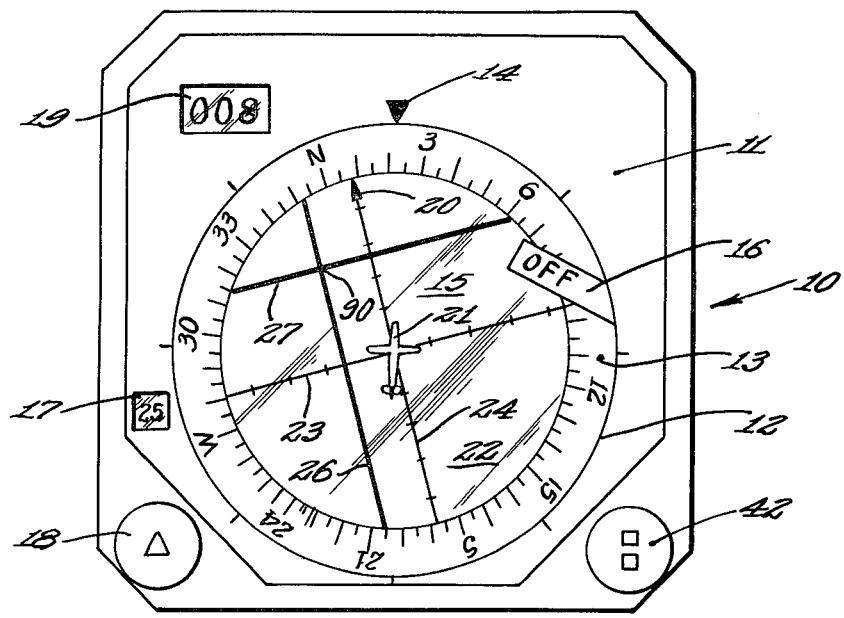
FIG. 1 is a plan view of the rectilinear navigation director of this invention.

FIG. 1 illustrates a navigation director designated generally as 10 comprising a case having a front panel 11 that might, for example, be mounted in the instrument panel of an aircraft. The face 11 is formed with an opening 12 and a compass ring 13 is rotatably mounted in the instrument so as to indicate against an indicia 14 the heading of the aircraft. An aircraft indicia 21 is printed on the center of a cover glass 15 mounted on the face of the instrument in the opening 12. An OFF flag 16 moves into the opening 12 to indicate that the instrument is OFF when a signal is not being applied to the instrument.

A plate 22 is rotatably mounted relative to the case 11 and carries a pair of indicia 23 and 24 which cross at the aircraft indicia 21. A pair of meter movements are mounted parallel to the indicia 23 and 24 and are adapted to move at right angles to each other. The meter movements 26 and 27 rotate with the plate 22 and remain parallel to the indicia 24 and 23, respectively, at all times. A scale changing knob 18 is mounted on the front 11 of the instrument and a window 17 indicates the scale of the setting of the instrument. The indicia 23 and 24 have cross marks which each represent the distance indicated in the scale window 17, for example. A course knob 42 rotates the plate 22 including the indicia 23 and 24 and the meter movements 26 and 27 to a course as indicated in window 19 of the instrument.

Figure 3:
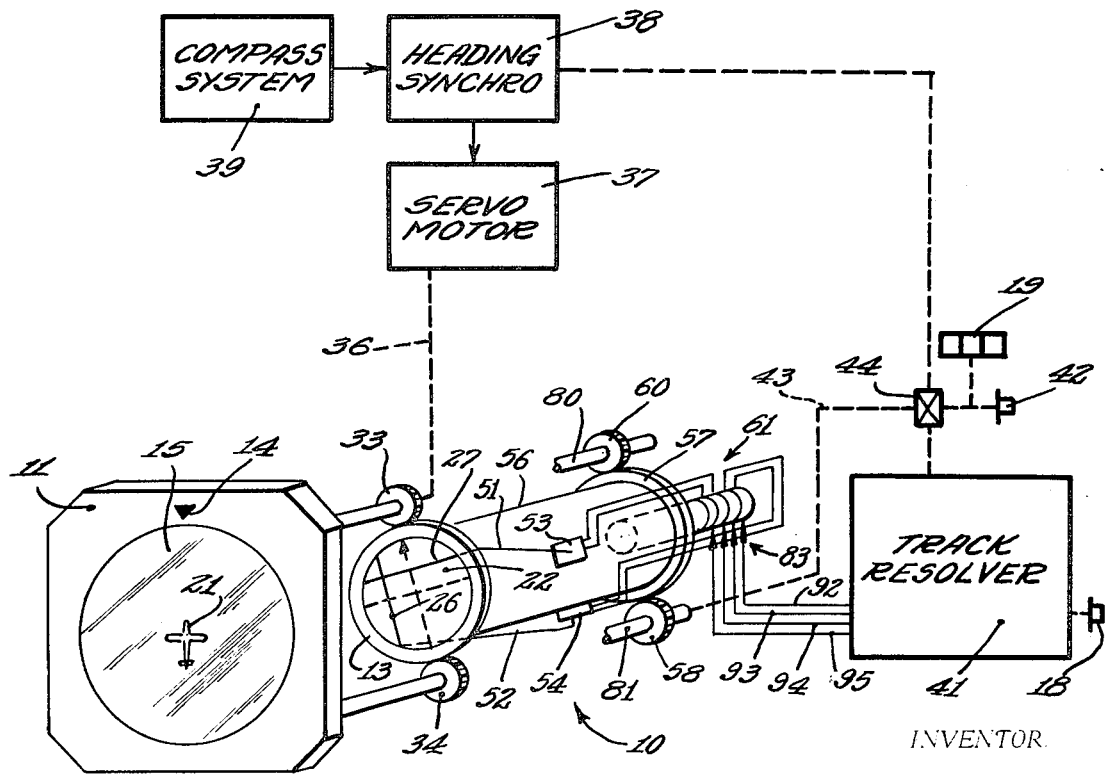
FIG. 3 is a partially exploded view of the director of the invention.

FIG. 3 is a partially cut-away view of the director 10 and it is to be noted that the compass ring 13 is rotatably supported by gears 33 and 34 which are mounted on shafts 31 and 32 attached to the front panel 11 of the instrument. A compass system 39 supplies an output to a heading synchro 38 which drives a servo motor 37 that has an output shaft 36 which drives the gear 33 to position the compass ring 13 relative to the indicia 14 on the front panel 11 of the instrument. The compass ring has suitable indicia printed about its surface so that the heading of the aircraft relative to the indicia 14 is continuously indicated adjacent the indicia 14 as seen in FIG. 1.

A meter movement housing 56 is supported in the instrument 10 and has a driving ring 57 connected to it which engage with gears 58 and 60 mounted on shafts 80 and 81. Meter movements 53 and 54 mounted on the member 56 carry arms 51 and 52, respectively, which are connected to the indicators 26 and 27. The meter movements 53 and 54 are connected to slip rings 61 which are engageable by a plurality of brushes 83 which are connected by leads 92, 93, 94 and 95, respectively, to a track resolver 41. It is to be realized that the compass ring 13 is supported by four gears similar to gears 33 and 34 equally spaced about its periphery but that in FIG. 3 only the two on the one side are visible. Likewise, the meter movement assembly 56 is supported by four gears similar to the gears 58 and 60 but only two of these gears are visible in FIG. 3.

The meter movement assembly 56 is driven by shaft 43 which is connected to a differential 44. Track resolver 41 is also connected to differential 44. The track setting knob 42 supplies an input to the differential 44 and the track indicator 19 indicates the track set by the knob 42.

FIG. 2 illustrates a navigation system utilizing the rectilinear navigation director of the invention which includes a VOR receiver 68 and a DME receiver 67 which supply inputs to an OBI resolver 64. Resolver 64 supplies X and Y outputs to summing amplifiers 81 and 62, respectively, which also receive inputs from a waypoint bearing resolver 63. An input knob 74 sets the bearing of a waypoint from the VOR receiver into the resolver and an indicator 73 indicates the bearing to the waypoint from the VOR station. A waypoint distance potentiometer 66 supplies an input to the waypoint bearing resolver 63 and has a knob 72 for setting the distance to the waypoint from the VOR station. An indicator 71 indicates the distance between the waypoint and the VOR station.

The track resolver 41 receives the outputs from the summing amplifiers 81 and 62 and has an output gain control 18 which controls the scale indicated on the face of the instrument in the window 17. The track setting knob 42 is connected to the differential 44 and the output shaft of the differential is applied to the track resolver and to the instrument through shaft 43 to drive the indicator assembly 56 as shown in FIG. 3.

In operation, the compass system 39 continuously positions the compass ring 13 so that the heading of the aircraft is indicated on the instrument relative to the indicia 14. It is to be noted that the fixed indicia 21 of the aircraft points toward the indicia 14 on the face of the instrument. The DME receiver 67 and VOR receiver 68 are tuned to ground stations and a waypoint may be selected by setting the waypoint potentiometer 66 by the knob 72 so that the distance to the waypoint is indicated in the window 71. This distance is the distance from the VOR station to the selected way-point. The knob 74 is rotated so that the waypoint bearing resolver 63 is set to the bearing of the selected waypoint from the VOR station and this is indicated in the window 73. The knob 42 is rotated to select a desired track which is indicated in the window 19. It is to be noted that the indicia 24 has an arrowhead 20 so that the pilot may observe whether the waypoint is ahead or behind the aircraft. The meter movements 26 and 27 will indicate the relative position of the waypoint from the aircraft and the waypoint is represented by the crossing point indicated as 90 on the instrument in FIG. 1. For example, in the example of FIG. 1, the aircraft has a heading of about 22° and the track knob 42 has been set to 8°. If the pilot in this example wishes to fly to the waypoint 90 he may bank the aircraft to the left so that the indicia 21 points toward the waypoint 90. As he turns the aircraft, compass ring 13 will rotate indicating the change in heading against the indicia 14 and the meter movement assembly 56 will rotate until the aircraft is pointed toward the intersection point 90 of the meter movements 26 and 27. If the pilot wishes to fly to a point which is offset from the waypoint he may maintain the needle 26 a fixed distance offset from the aircraft indicia 21 and thus fly on a parallel track which passes through a point to the right or left of the waypoint. This mode would be useful in flying parallel tracks on airways or elsewhere where many aircraft are operating and each aircraft could utilize a different offset to either the right or left if desired.

It is seen that this invention provides a navigation director which continuously indicates the aircraft's position relative to a selected waypoint and gives the pilot a plan view of his position. It is to be realized that the VOR station, itself, may be utilized as a waypoint if desired, with the waypoint potentiometer 66 and knob 72 being set to indicate zero distance from the station and the cross point 90 of the meter movements 26 and 27 will indicate the ground transmitter's position relative to the aircraft.

Although the invention has been described with respect to a preferred embodiment, it is not to be so limited as changes and modifications may be made therein which are within the full intent and scope as defined by the claims.

I claim:

1. An aircraft instrument with a fixed aircraft indicia formed on its face, a heading ring rotatably mounted on the face and movable to indicate the aircraft's heading, and a pair of cross pointer indicators mounted so that they move at right angles to each other on the face of the instrument and rotatably supported by the instrument so that they rotate relative to the instrument and said aircraft indicia.

2. An aircraft instrument according to claim 1 comprising means for rotating said pair of cross pointer indicators independent of said heading ring.

3. An aircraft instrument according to claim 1 comprising a compass connected to drive said heading ring.

4. An aircraft instrument according to claim 1 comprising a track resolver connected to drive said cross pointer indicators.

5. An aircraft instrument according to claim 4 comprising a meter movement assembly rotatably supported relative to said instrument and having meter movements supporting said cross pointer indicators, slip rings mounted on said meter movement assembly and connected to said meter movements, and brushes engageable with said slip rings and connected to said track resolver.

6. An aircraft instrument according to claim 5 comprising a ring gear connected to said meter movement assembly, and support gears rotatably supported by said instrument and engageable with said ring gear.

7. An aircraft instrument according to claim 6 comprising means for driving one of said support gears so that the position of said cross pointer indicators correspond to a desired track angle.

8. An aircraft instrument according to claim 7 comprising a rotating plate on said meter movement assembly adjacent said cross pointer indicators and a pair of reference line indicators formed at right angles to each other on said rotating plate.

9. An aircraft instrument according to claim 8 comprising scale indicia formed on said reference line indicators.

10. An aircraft instrument according to claim 7 including an area navigation system connected to said track resolver to drive said cross pointer indicators.

* * * * *